No. 618,682. Patented Jan. 31, 1899.
J. H. JOHNSON & W. FRAVEL.
FLOUR CABINET.
(Application filed Oct. 23, 1897.)
(No Model.)
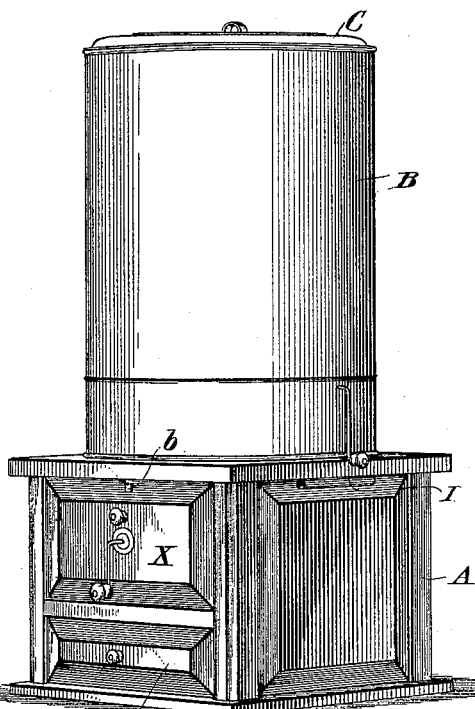
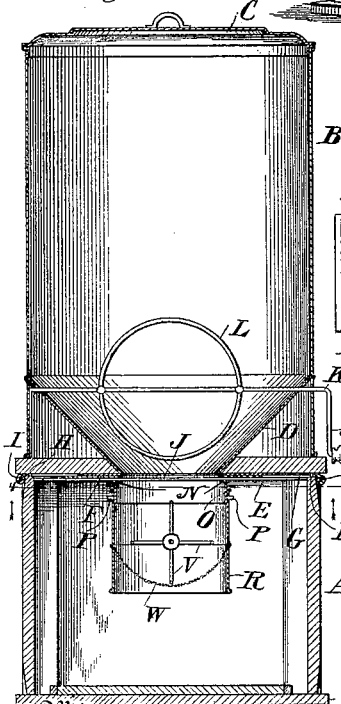
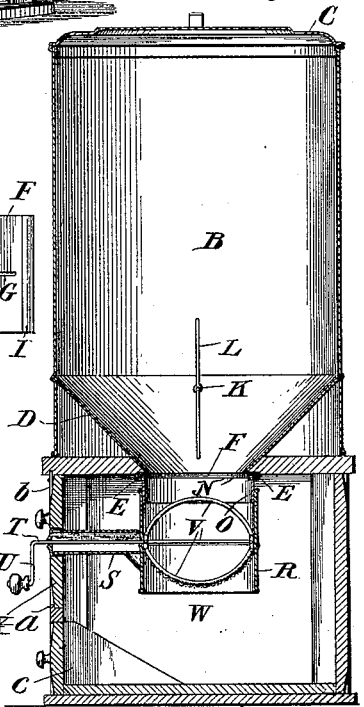
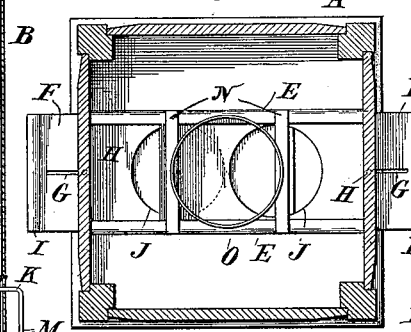
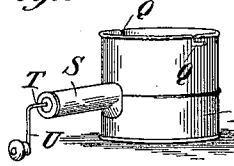
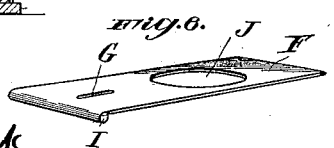
THE NORRIS PETERS CO., PHOTO-LITHO., WASHINGTON, D. C.

UNITED STATES PATENT OFFICE.

JAMES HENRY JOHNSON AND WARREN FRAVEL, OF MEMPHIS, MISSOURI.

FLOUR-CABINET.

SPECIFICATION forming part of Letters Patent No. 618,682, dated January 31, 1899.

Application filed October 23, 1897. Serial No. 656,180. (No model.)

*To all whom it may concern:*

Be it known that we, JAMES HENRY JOHNSON and WARREN FRAVEL, residing at Memphis, in the county of Scotland and State of Missouri, have invented a new and useful Flour-Cabinet, of which the following is a specification.

This invention relates to improvements in flour-cabinets; and the object of the same is to provide a cabinet for containing flour from which the latter may be drawn in the desired quantity after having been sifted, the device being simple in construction and convenient in operation.

Another object of the invention is to provide means for varying the size of the outlet-opening and at the same time keep the same central and also so that it may be entirely closed and the weight of the flour in the receptacle supported thereby and prevented from clogging the sifter.

A further object of the invention is to so construct the sifting device that the same may be readily removed from the cabinet for cleaning or any other purpose.

With these and other objects in view the invention consists of a supporting-base or cabinet, a receptacle positioned thereon and communicating therewith for containing the flour, a sifting device detachably secured to the outlet of the receptacle, a stirrer within the receptacle, and slides movable one upon the other beneath the outlet and provided with openings adapted to register with each other and with the outlet of the receptacle, and, when drawn outwardly, to vary the size of the outlet-opening and at the same time keep the same central.

The invention further consists in the improved construction, arrangement, and combination of parts hereinafter fully described, and afterward specifically pointed out in the claim.

In order to enable others skilled in the art to which our invention most nearly appertains to make and use the same, we will now proceed to describe its construction and operation, having reference to the accompanying drawings, forming part of this specification, in which—

Figure 1 is a perspective view of our invention. Fig. 2 is a vertical sectional view of the same. Fig. 3 is a similar view taken at right angles to Fig. 2. Fig. 4 is a transverse section on the line 4 4 of Fig. 2. Fig. 5 is a perspective view of the sifting device removed from the cabinet, and Fig. 6 is a perspective view of one of the slides.

Like letters of reference mark the same parts wherever they occur in the various figures of the drawings.

Referring to the accompanying drawings, A indicates the supporting-base or cabinet, and positioned upon the top thereof is the cylindrical flour-receptacle B, having the cover C at its upper end, and the funnel-shaped bottom D, the upper edge of said bottom being secured within the receptacle at a point above the lower end thereof. The lower open end of the funnel-shaped bottom D extends through the top board of the cabinet and has its lower end flush with the inner face of said board, as illustrated, and secured to the under side of said board on opposite sides of the outlet-opening are the guide-strips E, which extend from side to side of the cabinet to receive the slides F, which move therein. These slides F extend through openings formed in the sides of the cabinet in line with the guide-strips and are formed with slots G, through which pins H, carried by the side of the cabinet, extend, so that the movement of said slides is thus limited. Each slide is provided at its outer edge with a roll I, which forms a handle therefor, and adjacent its inner end with an opening J of the same size as the outlet-opening of the receptacle. Thus when the slides have reached the limit of their inward movement, as shown in Fig. 2, their openings J will register with each other and with the outlet-opening of the flour-receptacle, so that the flour may pass freely from the latter. When, however, the slides are drawn outward, the openings therein move across each other so as to vary the size of the outlet and at the same time keep the same central, the size of the outlet being decreased as the slides are drawn outward until said slides have reached their limit of outward movement, as illustrated in Fig. 4, when the outlet is entirely closed and the weight of flour rests thereon and not upon the sifter, which would result in clogging the latter.

The shaft K extends through the receptacle adjacent the lower end thereof, said shaft having the circular agitator L secured thereon and provided at its outer end with the crank M. This stirrer or agitator serves to effectually prevent the clogging of the flour in the lower end of the receptacle.

Secured on the under side of the top of the cabinet to the guide-strips E and the cross-strips N, connecting the former, is the collar O, which is the same size as the outlet-opening and is provided with the projecting pins P for the purpose of engaging the bayonet-slots Q, formed in the upper edge of the cylindrical open-ended casing R of the sifter, so that the latter is detachably secured to said collar. Casing R is provided with the lateral bearing S for the agitator-shaft T, which shaft is provided at its outer end with the crank U and having secured thereto within the casing the radially-disposed loops V, which constitute the agitator for sifting the flour, the same acting in conjunction with the sieve W, which is secured within the casing beneath the loops, and being of such cross-sectional construction so as to conform to said loops. A removable door X is provided in the side of the cabinet adjacent its top, said door being confined in place at its lower edge by a bead or flange $a$, formed on the cabinet, and at its upper edge by a button $b$, said door loosely receiving and supporting the outer end of bearing S, so that said sieve may be removed by removing the door.

$c$ is a drawer adapted to hold the pan or other receptacle which is to receive the sifted flour.

From the foregoing description it will be seen that we have produced a cabinet which is extremely simple in construction in which the flour may be placed and removed therefrom in the desired quantities after having been sifted, the size of the outlet thereof being varied, as desired, and at the same time kept central, and the sifting device being detachable, so that it may be removed at any time.

Having thus fully described our invention, what we claim as new, and desire to secure by Letters Patent of the United States, is—

A cabinet of the class described comprising a supporting-base or cabinet, a receptacle positioned thereon and communicating therewith, a collar secured about the outlet of the receptacle, a sifter comprising a casing adapted to be detachably secured to the collar, said casing having a lateral bearing, a shaft mounted in said bearing, an agitator carried by said shaft within the casing, a sieve arranged beneath the agitator, and a removable door for the supporting-base or cabinet, said door adapted to loosely support the outer end of the lateral bearing, substantially as set forth.

JAMES HENRY JOHNSON.
WARREN FRAVEL.

Witnesses:
NAT. T. MCKEE,
WM. L. SCOTT.